Patented Feb. 5, 1952

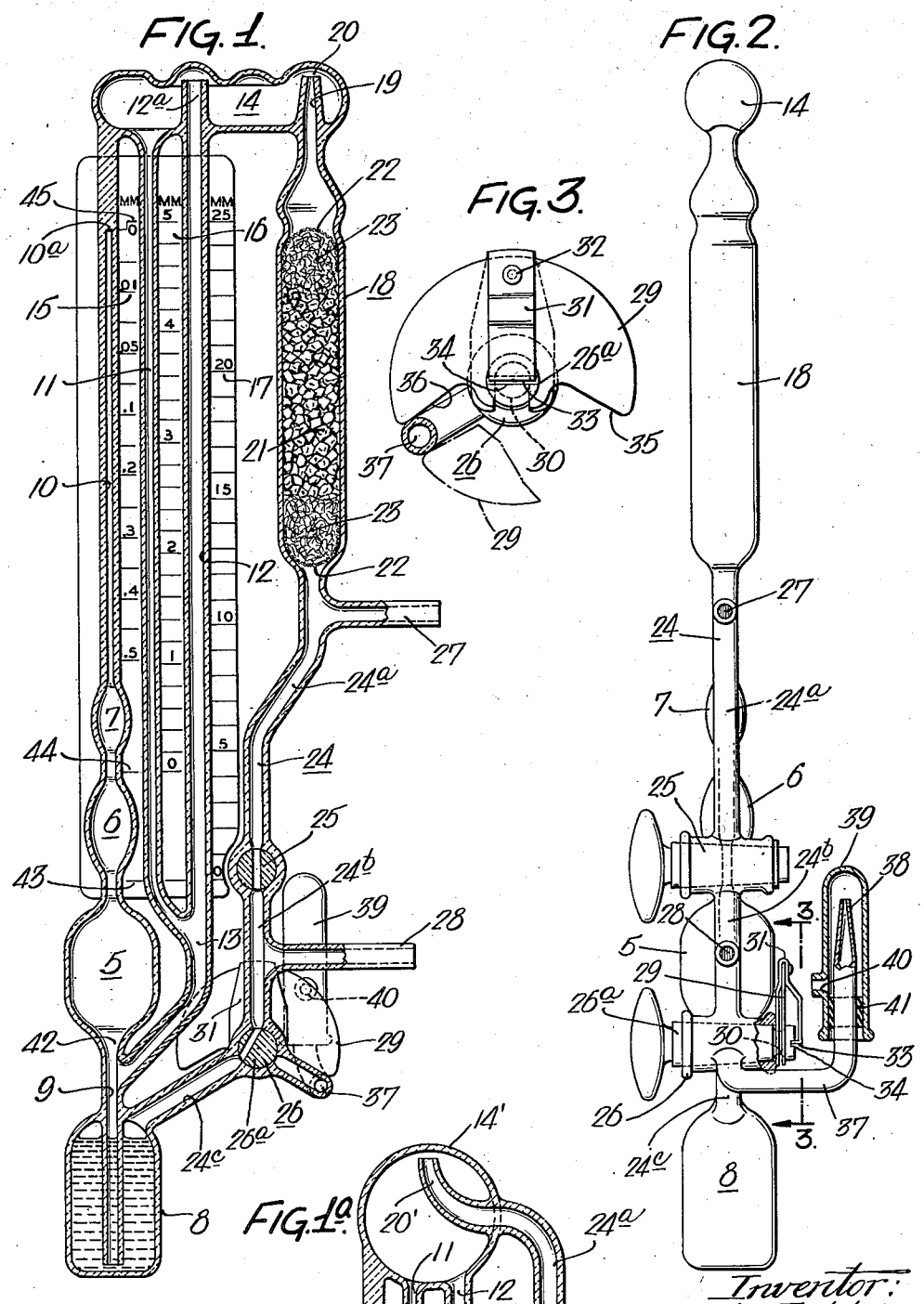

2,584,945

UNITED STATES PATENT OFFICE 2,584,945

VACUUM GAUGE

Floyd Todd, Springfield, Pa.

Application July 8, 1949, Serial No. 103,611

9 Claims. (Cl. 73—400)

This invention relates to low pressure vacuum gauges and more particularly to a gauge known in the art as the "McLeod" type.

The underlying principle of all McLeod gauges is that a measured volume of highly rarefied gas is condensed or compressed to a much smaller volume under the action of a definite pressure, and the volume of the gas when compressed is an indication of the pressure of the rarefied gas. In the conventional McLeod gauge, a compression chamber or bulb of known volume is provided with a connection from its lower part to the rarefied gas to be measured, and is also provided with a capillary tube at its top which is graduated along its length so that the graduations starting from the tip of the capillary tube are in terms of pressure. Provision is made for causing mercury to close off the compression chamber at the lower end and to enter the chamber at a predetermined pressure. As the mercury rises within the compression chamber, it compresses the entrapped gas into the capillary tube, and the mercury will rise in the capillary tube until the pressure of the entrapped gas is sufficient to counterbalance the pressure of the mercury. Various arrangements have been proposed for supplying the mercury to the compression chamber and for eliminating the effects of variation in atmospheric pressure on the gauge.

In one form of the McLeod gauge, mercury is supplied to the compression chamber from a leveling bulb containing mercury which has a connection to the lower end of the compression chamber or bulb through rubber tubing of suitable length, and the mercury may be caused to flow into the compression chamber by raising the leveling bulb above the level of the compression chamber. In this form of gauge, the leveling bulb is open at one end to atmospheric pressure, and it then becomes necessary to provide a column of mercury between the gauge and the leveling bulb of sufficient length to balance the difference between the atmospheric pressure and the pressure within the high vacuum system. This usually requires a column of mercury of the order of 760 mm. (30") and this column is usually provided by a 30" glass tube extension arranged below the gauge and at the lower end of which the leveling bulb is attached by means of rubber tubing. Such construction is extremely bulky, is time-consuming in operation, and is not readily moved about from one location to another.

In another form of the McLeod gauge, a hand operated pump is employed to force the mercury into the compression chamber instead of raising or lowering a leveling bulb, but in this case as well as the arrangement above, the accuracy of the gauge depends upon the accuracy of the manual manipulation of the leveling bulb or that of the pump.

It has also been proposed to have an auxiliary vacuum applied to the leveling bulb instead of atmospheric pressure, in order to eliminate the mercury column forming the atmospheric seal, and thereby shorten the tube. In order to make a reading in such a gauge, the auxiliary vacuum is partially dispelled in order to cause the mercury to enter the compression bulb in the gauge. After the reading is made, the auxiliary vacuum must be established again within the leveling bulb. Such modification requires a means for producing the auxiliary vacuum for making a pressure reading.

In another form of McLeod gauge, the compressing fluid of the gauge is enclosed within a chamber or reservoir entirely sealed from atmospheric pressure, and provision is made for manually varying the volume of the reservoir containing the compressing fluid to cause the fluid to rise within the compression chamber. Such an arrangement is likewise objectionable because its accuracy depends upon the skill of the manual adjustment of the volume of the reservoir containing compressing fluid and is slow in operation.

In another prior construction, the compression chamber and leveling chamber are formed of an integral glass structure mounted to pivot on a ground glass swivel so that the action of gravity causes the mercury to enter and leave the compression chamber. This form is subject to many objections of the other known forms of gauges, and being mounted upon a glass swivel, is extremely fragile. Also, this gauge requires rotation of the gauge through 90° from the reading position to the resetting position. This operation is time-consuming and reduces accuracy.

In another form of pivoted gauge, the ground glass swivel is replaced by rubber or plastic tubing in order to allow a flexible connection for the rotation of the gauge. Because of the inherent porosity and dissolved gases contained in even the best rubber or plastic tubing, the normal leakage of rubber or plastic tubing makes this type of gauge unsuitable for measuring low pressures where a high degree of accuracy is required.

One of the most serious disadvantages present in all of the above types of gauges resides in the fact that only one limiting range of vacuum measurement can be made on each gauge. In order to cover the entire range of vacuum measurements, several gauges with different ranges are required.

An object of the present invention is to provide a single pressure gauge of the McLeod type having multiple stages which cover the entire range of pressures at which this type of gauge is used in practice.

Another object is to provide a compact stationary type of McLeod gauge which may be easily and readily transported from one location to another.

Another object is to provide a pressure gauge of the stationary McLeod type having means for returning the mercury in the gauge from a reading to a resetting position without the need for an auxiliary vacuum pump, leveling bulb, rotation of gauge, or hand operated pump.

Another object is to provide a pressure gauge of the stationary McLeod type which has two arms which enable connection of both the vacuum pump and the system to be evacuated to the gauge itself, thereby eliminating the need for an auxiliary evacuation pump.

Another object is to provide a more accurate pressure gauge of the McLeod type in which the gauge scales have a capillary depression constant added thereto, thus enabling the use of large diameter capillary tubes.

Another object is to provide a pressure gauge of the stationary McLeod type which is provided with an improved compact safety trap at the top of the gauge which prevents the mercury from passing into the system or pump in case the gauge is improperly operated.

Another object is to provide a pressure gauge of the McLeod type which is provided with an improved design of sealed-in absorption tube which prevents moisture or corrosive vapors from entering the gauge. Small amounts of moisture or corrosive vapors not only cause serious errors in pressure readings, but also cause contamination of the mercury in the gauge.

Another object is to provide a pressure gauge of the stationary McLeod type which has an air inlet valve with fixed stops on the valve plug.

Another object is to provide a pressure gauge of the stationary McLeod type with a means for admitting a relatively constant and small supply of air to the upper part of the mercury reservoir.

A still further object is to provide a gauge of the McLeod type having a plurality of interconnected gauge scales and a capillary depression constant.

Further objects will be apparent from the specification and drawings in which:

Fig. 1 is a vertical, longitudinal section of the improved McLeod gauge taken in accordance with the present invention;

Fig. 1a is a sectional detail of a modified form of mercury trap;

Fig. 2 is a side elevation of the gauge shown in Fig. 1; and

Fig. 3 is an enlarged detail as seen at 3—3 of Fig. 2.

The invention comprises essentially the provision of three capillary tubes of different internal diameters, the smallest tube being closed at its top and provided at its bottom with a plurality of bulbs or compression chambers, the volumes of which are accurately calculated in accordance with the bores of the capillary tubes. The two larger tubes open at their tops into a mercury trap which is in turn connected through an absorption trap to a source of vacuum to be measured. The bottoms of the two larger tubes join a conduit at the bottom of the largest compression chamber from whence communication is provided to the bottom of a mercury reservoir. The top of the mercury reservoir is connected to the absorption trap and source of vacuum to be measured through a length of glass tubing and a plurality of valves which may be operated to introduce a restricted flow of air under atmospheric pressure, to cause the mercury to rise in one or more of the capillary tubes, thus permitting an accurate vacuum measurement.

Referring now more particularly to the drawings, a McLeod type vacuum gauge constructed in accordance with the present invention comprises compression chambers 5, 6 and 7 of different known volumes. These chambers are connected in series to each other and to a mercury reservoir 8 through tube 9. The smallest compression chamber 7 is connected to the bottom of a vertical Torricellian tube 10 which is closed at its top 10a. A second capillary tube 11 of larger internal diameter than tube 10, and a third capillary tube 12 of larger internal diameter than tube 11 are connected at their bottom ends to conduit 9 by means of a length of tubing 13. The upper ends of tubes 11 and 12 communicate with a mercury trap 14 and tube 12 is extended up into trap 14 at 12a to afford minimum spilling of mercury from tube 12 into the trap. Each tube 10, 11 and 12 is provided with suitably calibrated scales 15, 16 and 17 respectively.

An absorption trap 18 is connected to mercury trap 14 by means of a riser 19 having a restricted orifice 20, thus preventing mercury in trap 14 from entering the absorption trap 18. Absorption trap 18 may be filled with water and corrosive vapor absorbing material 21 such as anhydrous calcium sulphate, calcium chloride, silica gel, or sodium hydroxide. These materials may be used either singly or in any desired combination and they are held in proper position by means of screens 22, 22 and glass wool 23, 23. The bottom of absorption trap 18 communicates with the top of reservoir 8 through a length of tubing 24 having sections 24a, 24b and 24c. Fig. 1a illustrates a mercury trap 14' of substantially circular cross-section and of somewhat larger diameter than trap 14. In this form, riser 12a is omitted, tubes 11 and 12 terminating at the bottom of trap 14'. Riser 20 however, is brought in horizontally at a point substantially in the middle of trap 14' and is curved interiorly of the trap to a point near the top thereof. It will be understood that the absorption trap 18 may be omitted entirely if desired, depending upon the nature of the vacuum system to be measured, or the trap may be incorporated in any other convenient part of the system. Fig. 1a shows the trap 14' connected directly to section 24a which extends either from trap 18 or trap 14' to a stopcock or valve 25. Tubing 27 is connected to the vacuum system to be measured, as noted above. However, in the event that such a system is provided with an accessible vacuum pump, the same pump may be used to return the mercury to the gauge by connecting the pump directly to connection 28. Therefore in some installations, inclusion of section 24a and valve 25 eliminates the necessity for a separate vacuum pump to return the mercury to reservoir 8.

Valve 26 is a conventional three-way stockcock including a valve plug 26a having a single bore. Valve 26 has been modified so that it is in effect a two-position valve in order to function properly in the present system. In the showing of Fig. 1, valve 26 connects sections 24b and 24c. A disc 29 is secured to the conventional annular groove 30 in valve plug 26 and a spring clip 31 is secured to disc 29 by means of rivet 32. Clip 31 is provided with a tongue 33 which cooperates with slot 34 to the rear of valve plug 26a. Clip 31 also extends on the opposite side of disc 29 to abut the valve body and provide sufficient sealing tension between the plug 26a and the valve body. Disc 29 is cut away to provide a pair of abutments 35 and 36 which serve as limit stops for turning plug 26a. The third arm 37 of valve 26 is carried horizontally backwards, as shown in Fig. 2, so that abutments 35 and 36 will strike arm 37 to prevent rotation of the valve plug 26a through a complete turn (Fig. 3). The location of arm 37 and abutments 35 and 36 is such that the valve 26 may be operated only to connect tube section 24b with section 24c, and section 24c with arm 37.

As shown in Fig. 2, arm 37 is carried upwardly and is provided with a restricted orifice 38 which is open to the atmosphere. To prevent introduction of dust or foreign matter, a suitable cap 39 having an orifice 40 is mounted on arm 37 by means of a rubber sleeve or grommet 41. It will be understood however, that the inclusion of the stop means for valve 26 is optional and may be omitted entirely. This will be desirable if for any reason atmospheric air should be admitted to the upper part of the gauge. In this event, the horizontal portion of arm 37 may be omitted and the restricted orifice 38 may be incorporated adjacent valve 26.

Referring to Fig. 1, it will be noted that connection 9 extends substantially to the bottom of reservoir 8 and is provided with a substantial restriction 42 at its junction with compression chamber 5 due to the partial enlarging of the bore of connection 9 at its juncture with tubing 13. This restriction or necking in the connection between reservoir 8 and chamber 5, as well as between chambers 5, 6 and 7, provides a sharp closing of the chambers and insures the trapping of the correct quantity of air, thereby increasing accuracy of gauge readings.

The volume of reservoir 8 is somewhat larger than the combined volumes of chambers 5, 6 and 7 and the reservoir may be easily filled with mercury by tilting the entire gauge until connection 28 is in a substantially vertical position. With valves 25 and 26 open, the desired amount of mercury may be poured into connection 28 until reservoir 8 is substantially filled.

*Operation*

When a vacuum system having an accessible vacuum pump is to be measured, tube 27 is connected to the system and conduit 28 is in communication with the pump. In this event, valve 25 is left open until conditions become stabilized. Valve 26 is then turned counterclockwise until the valve plug 26a cuts off the connection between sections 24b, 28 and 24c. In this condition the mercury is entirely contained within and substantially fills reservoir 8. In the event that the vacuum pump for the system to be measured is inaccessible, it will be desirable to attach connection 28 to a separate pump used solely for returning the mercury to reservoir 8. In this event, valve 25 will be closed to prevent the auxiliary vacuum from affecting the vacuum in the system to be measured.

To take the desired vacuum reading, valve 26 is additionally turned counterclockwise to connect tube section 24c with arm 37. The restricted orifice 38 then permits a slow constant flow of air through arm 37 and section 24c into the top of reservoir 8. This restricted and relatively slow rate of air intake is important in controlling the rising of mercury in tubes 10, 11 and 12 so that the operator may accurately stop the mercury at the desired point, as described below.

As air under atmospheric pressure enters the upper part of reservoir 8, the mercury rises through connection 9 into compression chamber 5. When the mercury reaches graduation 43 between chambers 5 and 6, the operator closes valve 26 and the pressure or vacuum reading is read directly on scale 17 in accordance with the height to which the mercury has risen in tube 12. Readings on scale 17 may be made between zero and 25.0 mm. However, if the pressure registered on scale 17 is less than 5.0 mm. of mercury, valve 26 is turned to admit more air through arm 37, thus forcing mercury in the reservoir to rise to the zero index or graduation 44 between chambers 6 and 7. In this event, the mercury will simultaneously rise in tube 11 and when the mercury reaches graduation 44, valve 26 is closed and pressures between zero and 5.0 mm. of mercury may then be read on scale 16. If the pressure as measured on scale 16 is less than 0.5 mm. of mercury, the process is repeated by re-opening valve 26 to admit additional air, thus permitting the mercury to rise to the graduation 45 at the top of tube 11. It will be noted that graduation 45 coincides with the 5.0 mm. calibration on scale 16. When the mercury reaches graduation 45, valve 26 is again closed and the reading may now be made directly on scale 15 in accordance with the height of mercury in tube 10. In practice, the operator may permit the mercury to rise in all of the tubes 10, 11 and 12 until it reaches the range that enables him to obtain the desired reading. By means of this continuous process, it is possible for the operator to obtain very accurate readings over a wide range of pressures with a minimum of time and effort.

After the proper reading is obtained, valve 25 is closed, thus retaining pressure in the upper portion of the gauge, namely tubes 10, 11 and 12 and traps 14 and 18. Valve 26 is then turned to connect sections 24b and 24c as shown in Fig. 1 and the small amount of air previously admitted may be exhausted through connection 28 by means of a suitable vacuum pump.

An important feature of the invention resides in the increased accuracy of obtaining pressure readings, and the time required. The relatively smaller bore of tube 10 with respect to tubes 11 and 12, enables the low pressure readings to be obtained almost instantaneously. Furthermore, the possibility of error due to "sticking" of the mercury to the bore of the tubes, is substantially reduced because the bore of tube 12 is also substantially greater than the bore of tubes 10 and 11. It is known that the sticking effect of mercury is considerably less as the bore of the capillary tube increases. Therefore, the larger the bore, the less the error due to this phenomenon.

In calibrating the scales, it is important to take into consideration differences in capillary depression. When the difference in the internal diameters of tubes is known, the difference in capillary depression of the mercury can be experimentally determined with great accuracy. This value is constant from very low pressure to atmospheric pressure and the incorporation of the capillary depression constant into the scale calibrations permit direct pressure readings to be obtained.

The fact that the bore of tube 12 is of substantially larger diameter than tubes 10 and 11 not only increases the range of the gauge but also enables the compression chambers 5, 6 and 7 to attain a condition of pressure equilibrium with traps 14 and 18 in a minimum of time, thus permitting a rapid series of pressure readings.

As is well known in the art, the volumes of the compression chambers 5, 6 and 7 as well as tube 10, may be calculated with extreme accuracy and may also be varied in accordance with the overall range to be covered by the gauge. This also permits accurate calibrations of scales 15, 16 and 17 which, it will be understood, include suitable corrections for differences in capillary depression as described above.

I have therefore provided an improved gauge of the McLeod type which is inexpensive, portable and compact. The gauge has an extremely wide range and enables very accurate readings to be obtained. Furthermore, the gauge being constructed of unitary glass tubing, is leakproof and no rubber or plastic parts are required.

It will of course, be understood that the number of compression chambers and capillary tubes used in conjunction with each other, may be varied in accordance with the particular purpose to which the gauge may be adapted without departing from the spirit of the invention.

Having thus described my invention, I claim:

1. In a McLeod type vacuum gauge, a mercury reservoir, a plurality of capillary tubes, one of said tubes being closed at its top, a connection between the bottom of said closed capillary tube and the reservoir, a connection between the upper end of at least one of said tubes and a source of vacuum to be measured, a plurality of compression chambers having relatively large internal diameters arranged one above the other in said connection, a restriction connecting each of said chambers and the reservoir, an air conduit communicating with said reservoir and with atmospheric pressure, and means in said air conduit for controlling the admission of selected volumes of air to the reservoir to cause the mercury in the reservoir to rise in at least one of said tubes and progressively in the chambers.

2. A vacuum gauge constructed in accordance with claim 1, in which the compression chambers are of different volumes in proportion to the volumes of the tubes, and in which the chambers are arranged in series with each other above and between the reservoir and the closed capillary tube, the largest chamber being adjacent the reservoir and the smallest chamber being adjacent the closed capillary tube.

3. A vacuum gauge constructed in accordance with claim 1, in which the restriction between the largest chamber and the reservoir is substantially less than the inside diameter of the smallest chamber.

4. A vacuum gauge constructed in accordance with claim 1, in which the restriction between each of the chambers is of substantially smaller diameter than the inside diameter of the smallest chamber.

5. A vacuum gauge of the McLeod type having a vertically disposed capillary tube closed at its upper end, a first compression chamber communicating with the bottom of said closed capillary tube, a second larger compression chamber communicating with the bottom of said first chamber, a third and largest chamber communicating with the bottom of said second chamber, a mercury reservoir communicating with the bottom of said third chamber, a second capillary tube of larger bore than the first capillary tube, a connection between the bottom of said second capillary tube and the top of the mercury reservoir, a third capillary tube of larger bore than the bore of said second tube, a connection between the bottom of said third capillary tube and the top of the mercury reservoir, means for admitting a relatively small quantity of gas under pressure to the top of the mercury reservoir, whereby the mercury is caused to rise in the capillary tubes progressively in accordance with the vacuum in said tubes, an upper connection between the second and third capillary tubes, said upper connection communicating with the source of vacuum to be measured, a connection between the source of vacuum and the reservoir, a first valve in said last-named connection between the source of vacuum and the gas admission means, and a second valve in the connection between the gas admission means and the reservoir.

6. A vacuum gauge of the McLeod type having a vertically disposed capillary tube closed at its upper end, a first compression chamber communicating with the bottom of said closed capillary tube, a second larger compression chamber, communicating with the bottom of said first chamber, a third and largest chamber communicating with the bottom of said second chamber, a mercury reservoir communicating with the bottom of said third chamber, a second capillary tube of larger bore than the first capillary tube, a connection between the bottom of said second capillary tube and the top of the mercury reservoir, a third capillary tube of larger bore than the bore of said second tube, a connection between the bottom of said third capillary tube and the top of the mercury reservoir, means for admitting a relatively small quantity of gas under pressure to the top of the mercury reservoir, whereby the mercury is caused to rise in the capillary tubes progressively in accordance with the vacuum in said tubes, an upper connection between the second and third capillary tubes, said upper connection communicating with the source of vacuum to be measured, a connection between the source of vacuum and the reservoir, a first valve in said last-named connection between the source of vacuum and the gas admission means, a second valve in the connection between the gas admission means and the reservoir, and an absorption trap in the connection between the tops of the tubes and the source of vacuum.

7. A vacuum gauge of the McLeod type having a vertically disposed capillary tube closed at its upper end, a first compression chamber communicating with the bottom of said closed capillary tube, a second larger compression chamber communicating with the bottom of said first chamber, a third and largest chamber communicating with the bottom of said second chamber, a mercury reservoir communicating with the bottom of said third chamber, a second capillary tube of larger bore than the first capillary tube, a connection between the bottom of said second capillary tube and the top of the mercury reservoir, a third capillary tube of larger bore than the bore of said second tube, a connection between the bottom of said third capillary tube and the top of the mercury reservoir, a mercury trap connected with the second and third capillary tubes, a connection between said mercury trap and a source of vacuum to be measured, an absorption trap in said last-named connection, and means for admitting a relatively small quantity of gas under pressure to the top of the mercury reservoir, whereby the mercury is caused to rise in the capillary tubes progressively in accordance with the vacuum in said tubes.

8. A vacuum gauge of the McLeod type having a vertically disposed capillary tube closed at its upper end, a first compression chamber communicating with the bottom of said closed capillary tube, a second larger compression chamber communicating with the bottom of said first chamber, a third and largest chamber communicating with the bottom of said second chamber, a mercury reservoir communicating with the bottom of said third chamber, a second capillary tube of larger bore than the first capillary tube, a connection between the bottom of said second capillary tube and the top of the mercury reservoir, a third capillary tube of larger bore than the bore of said second tube, a connection between the bottom of said third capillary tube and the top of the mercury reservoir, means for admitting a relatively small quantity of gas under pressure to the top of the mercury reservoir, whereby the mercury is caused to rise in the capillary tubes progressively in accordance with the vacuum in said tubes, a connection between the tops of the second and third capillary tubes and the source of vacuum to be measured, a connection between the tops of said tubes and the reservoir, a plurality of valves in said connection, and a restricted orifice communicating with said connection between said valves whereby atmospheric pressure and vacuum from the source to be measured may be selectively introduced to the reservoir upon manipulation of the valves.

9. A vacuum gauge of the McLeod type having a vertically disposed capillary tube closed at its upper end, a first compression chamber communicating with the bottom of said closed capillary tube, a second larger compression chamber communicating with the bottom of said first chamber, a third and largest chamber communicating with the bottom of said second chamber, a mercury reservoir communicating with the bottom of said third chamber, a second capillary tube of larger bore than the first capillary tube, a connection between the bottom of said second capillary tube and the top of the mercury reservoir, a third capillary tube of larger bore than the bore of said second tube, a connection between the bottom of said third capillary tube and the top of the mercury reservoir, a length of tubing connecting the second and third capillary tubes to the reservoir, a connection to a source of vacuum communicating with said length of tubing, a first valve in said length of tubing, said first valve being located between the vacuum connection and the reservoir, a connection to a vacuum pump communicating with said tubing between said first valve and the reservoir, a restricted orifice open to the atmosphere and communicating with said tubing between the vacuum pump connection and the reservoir, a second valve in said tubing for selectively connecting the restricted orifice to the tubing, and means for admitting a relatively small quantity of gas under pressure to the top of the mercury reservoir, whereby the mercury is caused to rise in the capillary tubes progressively in accordance with the vacuum in said tubes.

FLOYD TODD.

REFERENCES CITED

The following references are of record in the file of this patent:

UNITED STATES PATENTS

| Number | Name | Date |
|---|---|---|
| 1,749,007 | Wales | Mar. 4, 1930 |
| 2,286,384 | Sanderson | June 16, 1942 |

OTHER REFERENCES

Barr et al.: "Scientific Glass Blowing," etc., Instruments, volume 19, November 1946; pages 667, 668, 670, 672, 674 and 676.

Ubbelohde: "Automatische Abgekuerzte," etc. Zeitschrift fuer Angewandte Chemie; Jahrgang 1906, pages 754, 755, 756.

Wohl et al.: "Ueber die Benutzung," etc., Berichte der Deutschen Chemischen Gesellschaft; Jahrgang 38, IV, 1905, pages 4151–4154, inclusive.